April 12, 1960
R. L. BURTNER ET AL
2,932,392
APPARATUS FOR DETERMINING THE DENOMINATION
AND/OR GENUINENESS OF PAPER
MONEY AND THE LIKE
Filed Feb. 23, 1954
3 Sheets-Sheet 1
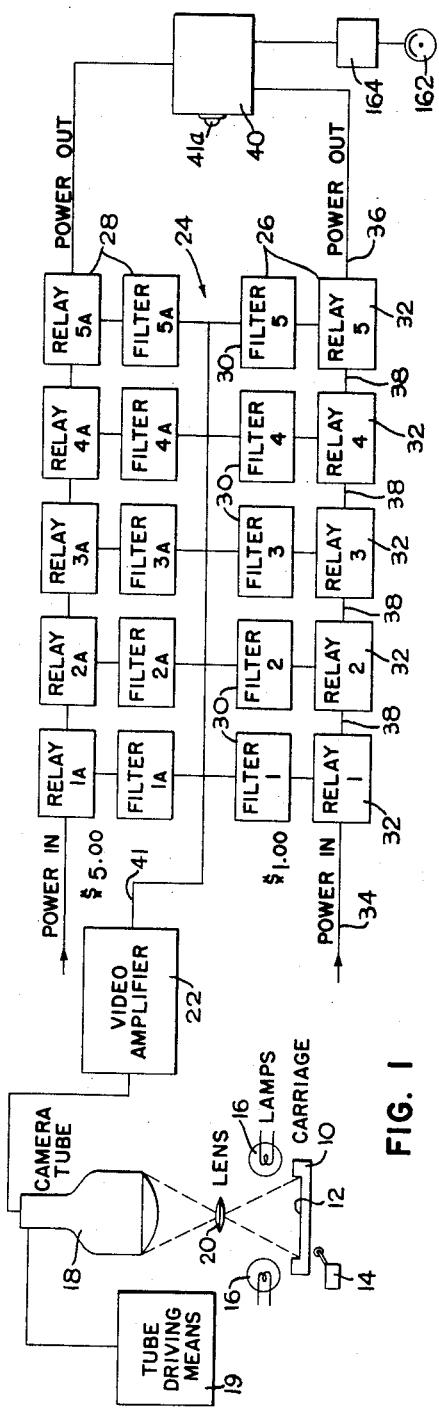
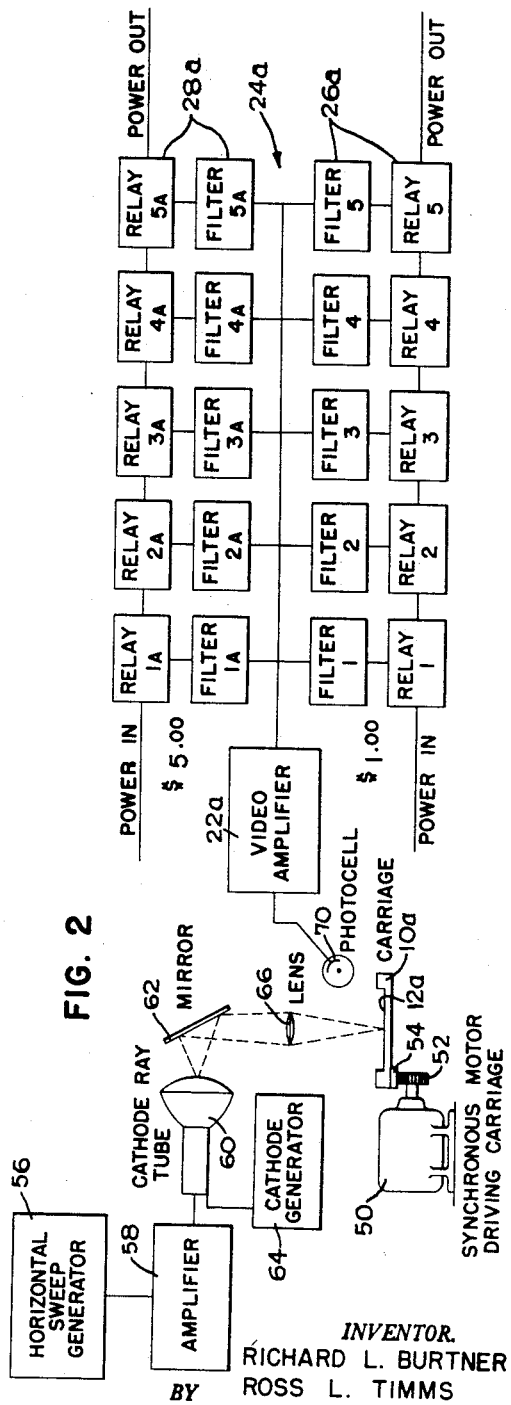
*INVENTOR.*
RICHARD L. BURTNER
BY ROSS L. TIMMS
*Oldham & Oldham*
ATTORNEYS April 12, 1960

R. L. BURTNER ET AL 2,932,392

APPARATUS FOR DETERMINING THE DENOMINATION
AND/OR GENUINENESS OF PAPER
MONEY AND THE LIKE

Filed Feb. 23, 1954

*INVENTOR.*
RICHARD L. BURTNER
BY ROSS L. TIMMS

*Oldham & Oldham*
ATTORNEYS

April 12, 1960 R. L. BURTNER ET AL 2,932,392
APPARATUS FOR DETERMINING THE DENOMINATION
AND/OR GENUINENESS OF PAPER
MONEY AND THE LIKE
Filed Feb. 23, 1954 3 Sheets-Sheet 3
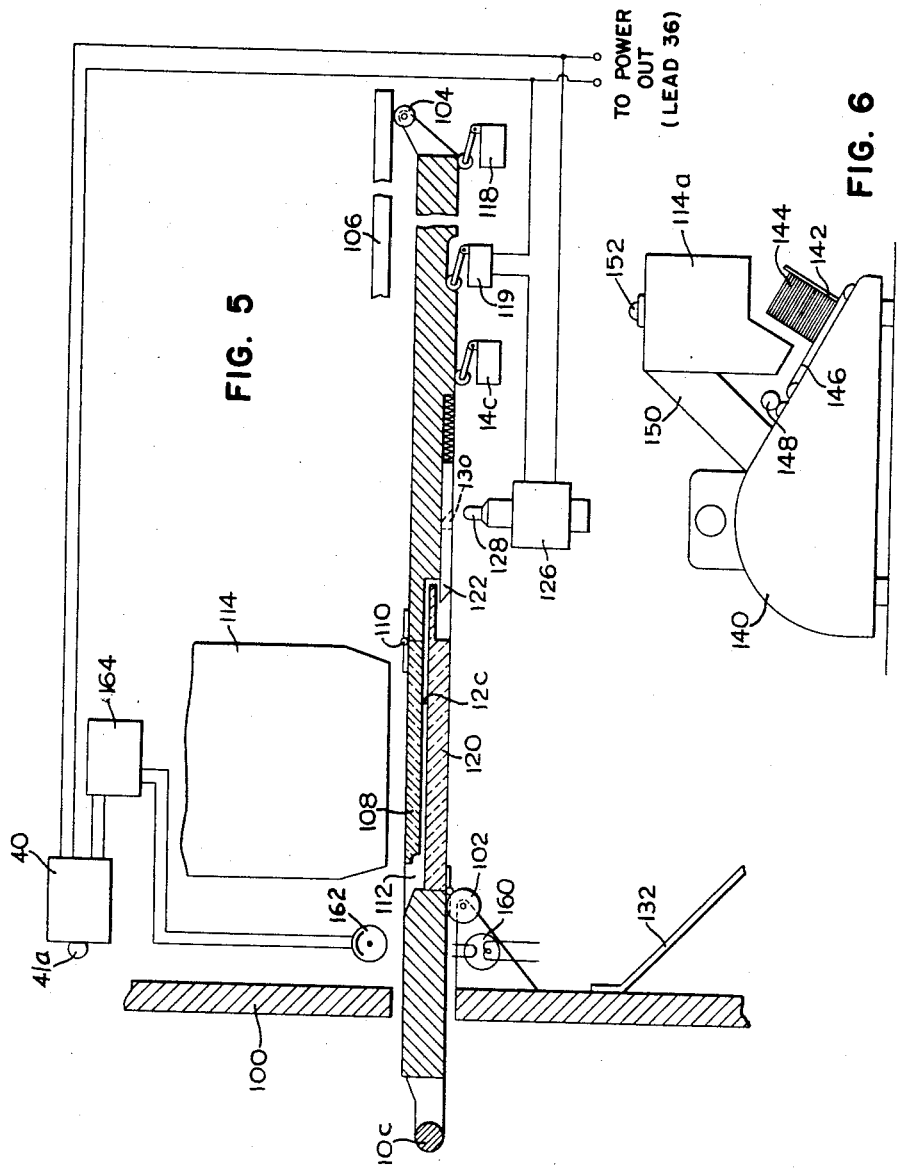
INVENTOR.
RICHARD L. BURTNER
BY ROSS L. TIMMS
Oldham & Oldham
ATTORNEYS United States Patent Office 2,932,392
Patented Apr. 12, 1960

2,932,392

APPARATUS FOR DETERMINING THE DENOMINATION AND/OR GENUINENESS OF PAPER MONEY AND THE LIKE

Richard L. Burtner, Canton, and Ross L. Timms, Akron, Ohio; said Timms assignor of twenty-five percent to Alan Foster, Cincinnati, and two and one-half percent to Albert H. Oldham, and two and one-half percent to Vern L. Oldham, Akron, Ohio Application February 23, 1954, Serial No. 411,946

8 Claims. (Cl. 209—111)

This invention relates to apparatus for examining paper and like documents, and particularly paper money, for genuineness or denomination, and, more particularly, is concerned with electronic apparatus for progressively scanning selected areas of the paper, converting the varying reflected light level into an electrical signal, electrically filtering the signal, and determining the genuineness and/or denomination of the paper when the proper filters respond in the proper sequence.

It is the general object of our invention to provide relatively simple, comparatively inexpensive apparatus for rapidly and accurately determining the genuineness and/or denomination of paper money, or the like.

Another object of our invention is the provision of apparatus for distinguishing between genuine and counterfeit money or other paper documents with almost completely foolproof accuracy and in a relatively short period of time, such as several seconds.

Another object of our invention is the provision of an apparatus adapted to be associated with a change-making machine, an automatic vending machine, and the like, and including a slide for receiving a piece of paper money, means for determining the genuineness and/or denomination of the money, means for retaining in the apparatus the paper money if it is found genuine, and means for triggering the delivery of change, merchandise, or performing some other function when the money is accepted as genuine and is retained by the apparatus.

Another object of our invention is to provide improved mechanism for use in conjunction with paper money counting means and whereby any counterfeits present in the paper money can be detected.

The foregoing objects of our invention, and other objects which will become apparent as the description proceeds, are achieved by the provision of apparatus including means for supporting the money to be examined, mechanism for generating an electric current in response to light reflected from the money, said mechanism at any instant picking up the light reflected substantially from a pinpoint-like area of the money, means incorporated in the mechanism to progressively generate imaginary lines, at relatively high frequency, in one direction on the money by movement of the point-like area, means incorporated in the mechanism to narrowly separate the aforesaid lines in a direction substantially at right angles to the lines to effect a progressive scanning of the light reflective properties of a selected area of the money, means for amplifying the electric current generated, a plurality of frequency responsive filters connected to the amplifying means, said filters being adjusted to accept in turn the frequencies generated by the progressive scanning of the light reflective properties of the selected area of the money if genuine and of proper denomination, interlock means associated with the filters whereby the filters can be actuated only in proper sequence, and means responsive to the interlock means for accepting the money.

In accord with the principles of the invention, each filter includes a series tuned resonant circuit, a tube with adjustable bias, and a multi-pole relay in the plate circuit of the tubes. When electrical energy is present at the frequency to which the circuit is tuned, a voltage buildup occurs at the grid of the tube causing it to fire and close its associated relay. Energy at all other frequencies is rejected by the filter.

The relay used with each filter circuit is of the mechanical latching type to close and stay closed once it is operated. All relays can be simultaneously reset. And the relays must be operated in proper sequence and must all be operated before a power-out voltage results to accept paper tested as genuine.

The apparatus usually includes a casing frame, a slide, such slide having a pocket adapted to receive the paper to be examined, means movable to and from a position holding the paper substantially flat in the pocket, means movably supporting the slide in the frame for movement to expose the pocket outside of the frame or to move the pocket inside the frame, means to effect the discharge of the paper from the pocket to the inside of the frame if it is determined to be genuine, and means to insure that the paper has been removed from the slide before actuation of the change making, the vending or other responsive apparatus.

For a better understanding of our invention, reference should be had to the accompanying drawings wherein:

Fig. 1 is a schematic diagram of one embodiment of apparatus incorporating the principles of the invention;

Figs. 2 and 3 are views similar to Fig. 1 but illustrating other embodiments of the invention;

Fig. 5 is a longitudinal vertical sectional view showing details of a paper money receiving slide forming a part of the apparatus; and Fig. 6 is a side elevation of a money counting machine having the counterfeit detecting apparatus of the invention incorporated therewith.

Figure 3:
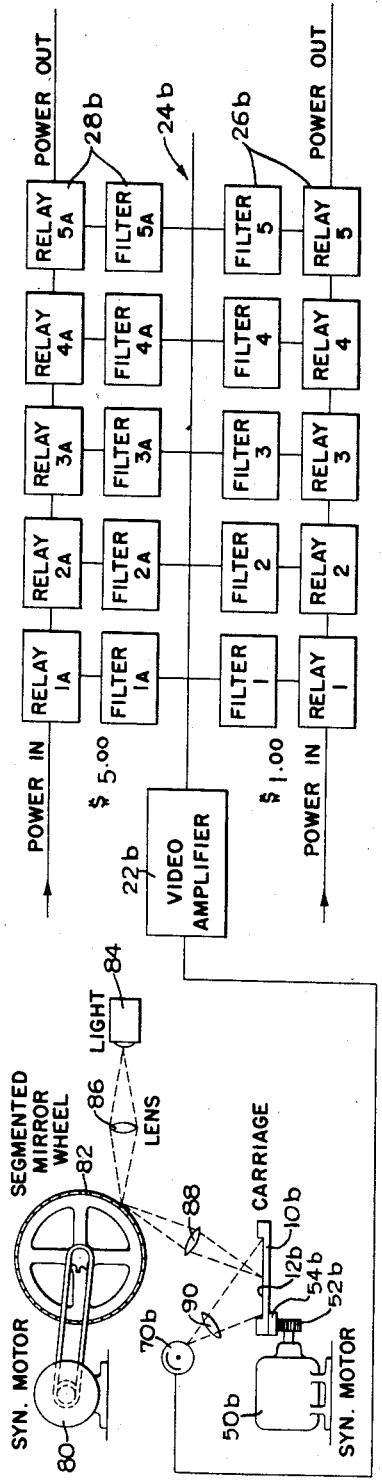

Although the invention is adapted broadly to the examination of papers, documents, and articles of a wide range and variety, the invention is particularly concerned with the identification or genuineness and/or denomination of paper money, and for simplicity purposes has been so illustrated and will be so described.

In Fig. 1 the numeral 10 indicates a carriage or slide having a pocket or other support 12 adapted to receive the piece of paper money to be identified. The carriage 10 is usually associated with a box or frame (shown for example in Fig. 5) so that the pocket 12 can be exposed outside of the box of the apparatus to receive the paper money and can then be moved to a position inside the box of the apparatus for identification purposes. The initial movement of the carriage 10 causes it to strike a limit switch 14 which turns on, i.e., starts, the operation of the identification apparatus.

Associated with the carriage 10, inside the box of the apparatus, are one or more lamps 16 for fully illuminating the paper money carried in the pocket 12. Positioned above the pocket 12, once the pocket has been moved to the inside of the apparatus box, is a television camera tube 18, for example an RCA type 6198 videcon, with suitable and known driving means 19. The camera tube 18 operates through a lens system 20 to effect a progressive pinpoint scanning of a selected portion of the paper money carried in the pocket 12. It will be understood that at any instant the camera tube 18 is looking at only a pinpoint-like area (for example, usually between about .0015 and .004 inch in diameter) of the paper money illuminated by the lamps 16, but with the known mechanism of the camera tube 18 moving the pinpoint-like area being examined in a series of sweep movements, usually horizontally, the sweeps defining imaginary lines, the centers of the lines of the sweeps being separated in a direction substantially at right angles to the direction of sweep by a distance about equal to or slightly less than equal to the width of each sweep line.

In the manner described a progressive scanning of a selected portion or of the entire paper money is achieved. Usually the progressive scanning operation is performed on a selected portion only of the bill being examined, this being accomplished either by the movement of the bill in a direction substantially at right angles to the scan direction of the pinpoint-like area or by relatively slow electrical displacement of the area in the same orthogonal direction. In either case it is necessary that the scan in the slow direction be accomplished at such a rate that the centers of successive horizontal scanning lines lie not more than .004 inch apart. The present embodiment of the invention utilizes a horizontal scan rate of approximately 360 scans per second which limits the rate of the orthogonal scan to not more than 360×.002 to .004=from .72 to 1.44 inches per second. With this arrangement a particularly high degree of scanning accuracy and resultant information is obtained even from very closely cross hatched or engraved areas of the paper money wherein as many as several hundred engraved lines per inch may be present.

The output of the camera tube 18 is an electric current which is passed to the video amplifier 22, the output of the amplifier 22 being connected to a bank of filters and relays indicated as a whole by the numeral 24.

We have discovered that the output of the camera tube 18 is a time varying electrical signal containing many and usually widely varied frequency components as generated by the alternate or otherwise arranged light and dark areas of the paper money. However, the relatively complex waveform of this electrical signal for each area scanned can be broken down into a plurality of individual sine wave frequencies which together form the complex waveform. Now if these individual sine wave frequencies are plotted on a frequency versus amplitude coordinate system the result is a spectrum which indicates the predominate frequency. It is to this predominate frequency for each area scanned, that the filter for the area is tuned.

The paper money scanned breaks down into a plurality of distinct areas each with a different spectrum and predominate frequency. For example, on the conventional United States of America one dollar bill beginning at the lower edge of the bill immediately underneath the picture of Washington and traveling upward the first printing on the bill is a horizontal straight line separated somewhat less than a thirty-second of an inch from a border formed by a series of vertically-directed parallel lines forming a second border approximately somewhat under a thirty-second of an inch high. This second border creates a relatively simple waveform at the output of the video amplifier 22 which contains a predominant and definite frequency component corresponding to the spacing between the vertical lines. The first filter is tuned to this frequency component. An entirely different and more complex spectrum results during the scanning of the cross hatching above the border last described and immediately under the words "In Silver Payable to the Bearer on Demand," but with this spectrum, also, creating a predominate frequency to which a second filter can be tuned. Still another spectrum results from the scanning of the words "In Silver Payable to the Bearer on Demand," and a third filter can be tuned to the predominate frequency of this spectrum. An entirely distinct set of frequencies, and a predominate frequency, is produced by the scanning of a portion of George Washington's coat, still another by the muffler immediately beneath his chin, still another on the cross hatching behind Washington in the oval picture, and so forth. And to each of the resulting spectra and its predominate frequency a filter can be tuned.

In other words, the camera tube 18 scans the selected portion of the bill and during this scan a considerable plurality of distinctly different frequencies are produced in the electric output of the camera tube in response to the different portions of the bill scanned. It will be understood that it is the preferred practice to so align the paper bill in the pocket 12 of the carriage 10 so that the scanning movement of the pinpoint-like area and the plurality of imaginary closely parallel lines produced in the scanning movement are parallel or substantially parallel to the lower edge of the bill, the scanning action beginning at the lower edge of the bill and progressing upwardly towards or through part or all of Washington's picture and/or the background for his picture.

The filter and relay system 24 connected to the output of the video amplifier 22 comprises a bank of filters and associated relays 26 particularly adapted for the examination of a one dollar bill, and a second set of filters and relays 28 adapted for the examination of a five dollar bill. Additional sets of filters and relays can be connected to the output of the video amplifier 22 for the determination of genuineness and denomination of ten and twenty dollar bills, or for still other denominations. Inasmuch as each bank of filters and associated relays is substantially identical in structure and arrangement to every other bank, and the banks differ only in adjustment, only a single bank of filters and associated relays will be described.

Figure 4:
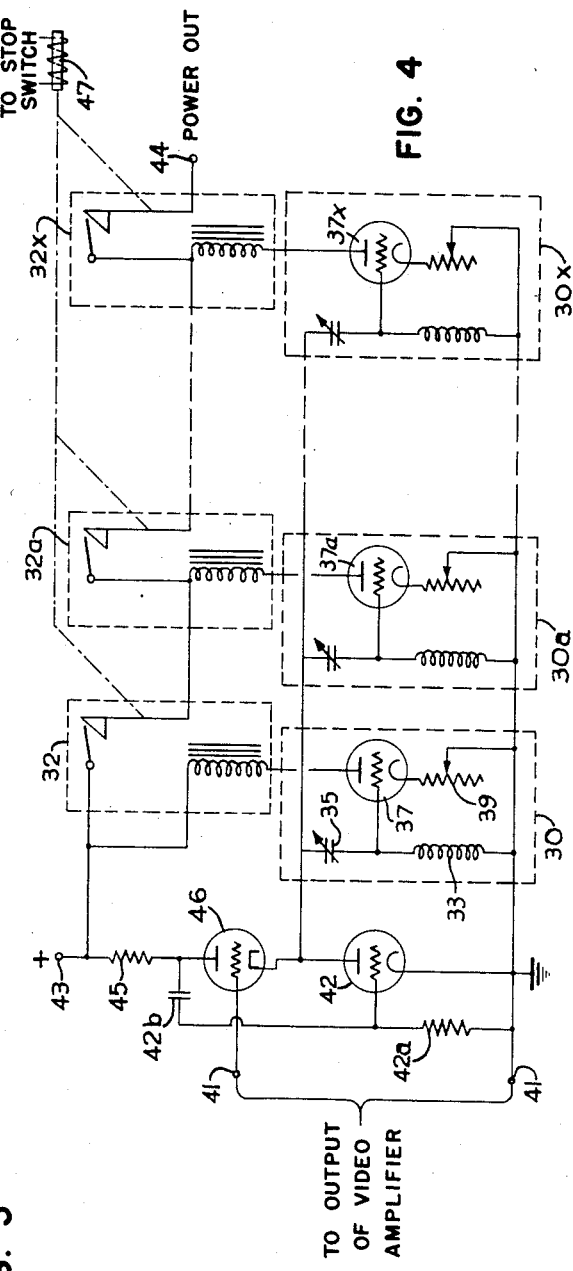
Fig. 4 is a schematic wiring diagram of the filter and interlock relays forming a part of the invention.

Having reference to both Figs. 1 and 4, the bank of filters and relays 26 includes a plurality of filters 30, for example five, marked filter Nos. 1, 2, 3, 4 and 5, each filter being directly connected to the output of the video amplifier 22. The output of each filter 30 is connected to a relay 32, marked relay Nos. 1, 2, 3, 4 and 5, relay No. 1 being connected to a "power in" electric lead 34, relay No. 5 being connected to a "power out" electric lead 36, and each relay being connected to the adjacent relay by power electric leads 38 so that when all of the relays 32 are closed the power in electric lead 34 is connected to the power out electric lead 36. The power out electric lead 36 is connected to a mechanism 40 for performing any suitable function once the paper money or bill being examined has been proved to be genuine and of a given denomination. For example, the mechanism 40 can include a signal light or buzzer, or both, 41a or, can give change for the identified bill, can deliver merchandise, with or without change, and will also actuate mechanism for retaining in the apparatus the bill which has been identified. Before mechanism 40 can operate a final switch therein must be closed by relay 164 operated by photocell 162 or other means, all as described in greater detail hereafter.

It should also be noted that the relays 32 are interlocked with each other so that no relay can close until the relay immediately prior to it is closed. In other words, the relays must close in turn, first No. 1, then No. 2, and so forth.

Having particular reference to Fig. 4, which illustrates in detail the construction and operation of the filters and associated relays, the filters have been designated by the numerals 30, 30a and 30x, and the relays by the numerals 32, 32a and 32x, it being understood that any selected number of filters and associated relays can be employed in an apparatus of the invention. Usually about five filters and relays are employed for each bill tested.

Each filter includes a tuned resonant circuit comprising coil 33, variable condenser 35, tube 37, and variable resistance 39 in the cathode lead to the tube. Typical values for these parts are as follows: coil 33—5 to 150 millihenries; condenser 35—20 to 250 mfd.; tube type 6N6, and resistance 39—150 ohms.

More broadly, any desired combination of L and C can be used to provide a tuned circuit of the desired frequency to match the predominant frequency, usually in the range of from 2 kc. to 100 kc. which range obviously is dependent upon sweep frequency. The range figures stated are for use with the sweep frequencies heretofore stated.

When electrical energy in sufficient predominate amount is present at the predominate frequency to which the filter is tuned, a voltage buildup occurs at the grid of the tube 37 causing it to fire and close its associated relay 32. Energy at all other frequencies is rejected by the filter.

The magnitude of the voltage buildup at the resonant frequency may be calculated by use of the equation $$E_L = QE_A$$

where $E_L$=voltage across the inductance
$E_A$=voltage applied to the resonant circuit
$Q$=filter parameter By use of a low impedance output stage on the video amplifier a circuit Q of 50 may be attained. From the equation given above it can be seen that, with this value of Q, even relatively small signals of the correct frequency are capable of reliably triggering the tube 37.

Examination of the circuit diagram of Fig. 4 shows that each successive tube 37a, 37x, etc. in a filter bank receives its plate power through the relay contacts on the preceding stage. This provides protection against counterfeit currency inasmuch as the circuit makes it mandatory that the filters be activated in the proper order (30, 30a, 30x etc.) if the bill is to be accepted as genuine. The bias adjustment 39 provides a convenient sensitivity control which may be set to accept only printed paper of a predetermined physical quality, rejecting that which is too worn, soiled or mutilated. Very new bills have been found to fire the tube 37 at low sensitivity setting of the variable bias 39, but the older the bill the more sensitive must be the setting of the bias 39 because it takes longer to build up the energy to fire the tube 37. The bias 39 is usually set to allow the apparatus to operate through the range of new to reasonably old bills.

The output leads 41 of the video amplifier are connected by tubes 42 and 46 with the filter banks. One lead 41 connects to the grid of tube 46, and one lead to the cathode of tube 42. From the negative or ground of the filter circuit likewise connected to the cathode of tube 42, a connection runs through a resistor 42a to the grid of tube 42 and through a condenser 42b to the plate of tube 46. The tubes 42 and 46 are typically 5687's, and function as low impedance output devices for coupling the output of the video amplifier to the filter. The anode of tube 42 connects to the variable condenser of each filter bank.

A positive high voltage is connected to the circuit of Fig. 4 at point 43 to supply power for operating the relays as each tube 37 fires and to provide a power out voltage at point 44 when all relays are closed. Point 43 connects through resistance 45 to the anode of tube 46. Typical values in the circuit include 470K ohms for resistor 42a, .002 mfd. for condenser 42b, and 3.9K for resistor 45.

Relays 32, 32a and 32x are of the self-latching type so that once operated they stay engaged until released by a solenoid 47 mechanically linked to release the relay latches, as for example upon the acceptance of the money being tested as genuine. In other words, when the mechanism 40 is operated the solenoid 47 is actuated to release relays 32, 32a, etc.

Each filter 30, 30a, etc. is adjusted by its variable condenser 35 and the size of the coil 33 so as to adapt it to test for a given frequency spectrum.

Thyratron type tubes may be used in the filter circuit instead of the tubes described and when this is done separate relays are not required.

It might be mentioned here that the apparatus of the invention can be constructed with a single bank of filters and relays 26 for operation upon paper money of a single denomination, for example one dollar bills, if this be desired for a particular installation.

The embodiment of the invention illustrated in Fig. 2 includes a carriage 10a having a pocket 12a adapted to receive the paper money to be examined, and in this form of the invention the carriage 10a is preferably driven by a synchronous motor 50 which carries a pinion gear 52 engaging with a rack 54 on the carriage whereby it is given a constant speed movement into the apparatus. The numeral 56 indicates a horizontal sweep generator of conventional type, and the output of the generator passes through an amplifier 58 whose output is connected to a cathode ray tube 60 to provide a continuously repeated horizontal sweep on its surface, for example 360 times per second. The cathode ray tube 60 may, for example, be of the 5WP15 type. Associated with the face of the cathode ray tube 60 is a mirror 62 positioned at an angle to the tube face, so as to reflect the pinpoint of light produced by the cathode generator 64 on the tube face to a lens system 66 and onto the face of the bill supported in the pocket 12a.

It will be understood that the apparatus described produces a pinpoint of light on the bill being examined, this pinpoint of light being approximately from .002 to .004 inch in diameter, and that the pinpoint of light is swept or moved across the selected area of the face of the bill because of the action of the horizontal sweep generator 56 the relatively large number of times per second as described. This sweeping movement of the pinpoint of light produces a series of imaginary lines, usually parallel to the bottom edge of the bill, as before described. The constant speed movement of the carriage 10a is at right angles, preferably, to the imaginary sweep lines to thereby make each imaginary line a spaced parallel distance from each other imaginary line, usually somewhat less than a full width of a line whereby a selected portion of the bill is given a progressive scan.

A photocell 70, for example of the 1P21 type, is positioned adjacent the carriage 10a and in a manner to pick up reflections from the bill, and the output of the photocell 70 passes to a video amplifier 22a whose output is connected to a filter and relay assembly 24a having separate banks 26a and 28a for one dollar and five dollar bills, respectively. The banks 26a and 28a of filters and relays are as heretofore described and function in a like manner.

The apparatus of Fig. 2 differs from the apparatus of Fig. 1 primarily in the fact that but a single scanning of the bill is obtained during the movement of the bill into the apparatus, whereas in Fig. 1 the camera tube 18 is capable of giving repeated scans over an identical area in the paper money being examined. However, even with the apparatus of Fig. 1 it is the usual procedure to scan the area examined only once. The apparatus of Fig. 2 may have limit switches associated with the carriage 10a to start and to reverse the operation of the motor 50 and to start and stop the scanning apparatus. The mechanisms of Figs. 1 and 2 are similar in the respect that each examines the light-reflective characteristics of a selected area of the paper money at any instant only over a pinpoint-like area of the money, but with the pinpoint-like area being progressively moved with a scanning action to provide a series of imaginary lines, the lines being closely parallel to each other.

In the form of the invention illustrated in Fig. 3, a carriage 10b is provided having a pocket 12b for receiving the paper money to be examined, and with the carriage 10b being moved into the apparatus by means of a synchronous motor 50b operating through a pinion gear 52b and a rack 54b. A synchronous motor 80 rotates a segmented mirror wheel 82 which has associated therewith a light 84 and lens systems 86 and 88. The arrangement is such that when the mirror wheel 82 is rotated a pinpoint of light, usually about .002 to about .004 inch in diameter, is given a plurality of sweeps across the pocket 12b, usually at right angles to the forward movement of the carriage by means of the synchronous motor 50b.

In this manner the selected portion of the bill is progressively scanned with a plurality of imaginary lines separated usually somewhat less than the width of one line, all as described in greater detail heretofore. Positioned in relation to the carriage 10b is a photocell 70b which may have an associated lens system 90, this photocell being, for example, of the 1P21 type and adapted to pick up the reflections of the pinpoint of light from the bill being examined. The output of the photocell 70b is connected to a video amplifier 22b, and its output is connected to a filter and relay system 24b having one or more banks of filters and relays 26b and 28b operable respectively on one dollar and five dollar bills.

The operation of the form of the invention shown in Fig. 3 is similar to that heretofore described, particularly with respect to the apparatus of Fig. 2.

In Fig. 5 is illustrated a slide or carriage, indicated as a whole by the numeral 10c and having pocket 12c, the carriage being mounted for movement into or out of the casing 100 containing the apparatus of the invention. Rollers 102 on the casing 100 and rollers 104 on the carriage, for example, mount the carriage 10c for sliding movement in the guide 106 of the casing 100. The pocket 12c is of a size to receive, for example, a standard United States currency paper money bill so that the bill will lay flat in the pocket and substantially fill the pocket.

Some suitable bill hold down means, such as a transparent cover 108 is hinged as at 110 to the carriage, with the carriage and cover 108 being appropriately slotted as at 112 so that the user of the apparatus can with his finger or fingernail move the cover means 108 from the full line closed position shown to an open position whereupon the bill can be positioned in the pocket 12c. Usually the bill is positioned transversely in the pocket, and per instructions, with the picture of Washington or other personage on the bill being uppermost and with the bottom of the picture towards the casing 100. With the bill in position in the pocket the cover 108 is moved down to the full line position to hold the bill flat in the pocket and in a position so that upon inward movement of the carriage 10c into the casing 100 the bill is presented to the scanning means of any one of the several types heretofore described, and indicated as a whole in Fig. 5 by the numeral 114.

The movement of the carriage 10c into the casing 100 of the apparatus is either done manually, as in the case of the apparatus of Fig. 1, or the manual movement of the carriage merely is enough to move the inner end of the carriage 10c against a microswitch 14c which starts the operation of the scanning apparatus 114 and also the operation of the motor 50 or 50b, in the case of the apparatus of Figs. 2 or 3, for driving the pinion 52 or 52b. The pinion 52 or 52b engages with a rack 54 or 54b associated with the bottom of the carriage 10a and 10b respectively. In order to avoid complicating Fig. 5 neither the rack nor the pinion are shown. When the carriage is moved completely to its innermost position, at which time the pocket 12c is fully positioned under the scanning apparatus 114, the end of the carriage strikes a second microswitch 118 to reverse the motor driving the pinion 52 and to shut off the scanning apparatus 114. Thereupon the motor driving the pinion 52 is reversed to move the carriage 10c to its outermost position and until such time as the motor is disconnected by the carriage moving off the microswitch 14c.

Some suitable means are provided for retaining the bill being examined inside of the casing 100 in the event the bill is identified as genuine and of the proper denomination. These means may take, for example, the form of a transparent false bottom 120 underneath the pocket 12c, the bottom 120 being pivotally mounted and held by a spring latch 122 in closed position to form the bottom of the pocket 12c. Now assuming that the carriage 10c is at its innermost position in the casing 100 of the apparatus and that the bill being examined has been accepted by the apparatus, the mechanism 40 of Fig. 1, connected to the power out electric lead 36 includes or is connected to a solenoid 126 (see Fig. 5) which is actuated concurrently with or as a part of the mechanism 40. The actuation of the solenoid 126 causes a pointed pin 128 to move vertically into engagement with a recess 130 in the under side of the spring latch 122 so that upon the beginning of the return movement of the carriage 10c towards its outermost position the false bottom 120 is allowed to drop down to an inclined or vertical position. The bottom of the pocket 12c is in this manner opened up and the bill being examined falls out of the pocket 12c and down against a chute 132 from where it is directed into a receptacle or stack not shown. As the slide or carriage 10c continues its outward movement limit switch 119 opens to de-energize solenoid 126 and the latch 122 is released. Continued outward movement of the carriage 10c causes the false bottom 120 to be swung back into its normal latched position shown in Fig. 5.

In order to prevent someone from "beating" the apparatus by sticking a genuine bill with adhesive onto the under surface of the cover, or onto the top surface of bottom 120 whereby the apparatus might examine the bill, find it genuine and release the bottom 120 only to have the customer recover the bill when the slide moves out, we provide a lamp 160 and a photocell 162 substantially in the position shown in Fig. 5. Thus, the photocell is only fired when the bottom 120 drops out of the way to release the bill into the chute 132, closes back up and there is nothing left in the way to prevent the light 160 from hitting the photocell 162 through transparent cover 108 and bottom 120. When the photocell fires it operates a latching relay 164 which closes a final switch in box 40 to cause the box to finally make change, deliver merchandise with or without change, etc.

We have illustrated in Fig. 6 the combination of our improved identification apparatus with a paper money counting machine, for example of the type sold under the trademark "Tickometer" by Pitney-Bowes, Inc. of Stamford, Connecticut. The money counting machine is indicated as a whole by the numeral 140, the machine including mechanism 142 holding a stack of paper money 144 to be counted. The mechanism generally includes a plurality of belts 146 for moving the bottom piece of paper money out from under the stack 144 and through counter rolls or mechanisms 148 from where it is again stacked after being counted. Apparatus of any of the types heretofore described in conjunction with Figs. 1 through 3 of the invention may be incorporated with the money counting apparatus 140. For example, appropriate apparatus 114a can be mounted upon suitable brackets 150 to position the apparatus so that it can scan each bill being passed from the stack 144 to the counter 148. If a non-genuine bill is detected by the apparatus 114a a red light 152 or other signalling means is fired and the counting mechanism 140 is automatically stopped.

The apparatus of Fig. 6 can readily be adapted to not only identify counterfeit but to separate or to count bills of different denominations. For example, if the apparatus 114a has associated therewith a separate bank of filters and associated relays for each one of a variety of denominations of bills then each one dollar bill will actuate through its power out electric lead the counter by only one number, each five dollar bill will actuate the counter for five, and so forth. Also, it is possible to separate the bills of different denominations into separate stacks, each one containing bills of like denominations, if this be desired, with or without counting of the money.

While in accord with the patent statutes we have specifically illustrated and described at least one embodiment of our invention, it is to be particularly understood that we are not to be limited thereto or thereby, but that the scope of our invention is defined in the appended claims.

We claim:

1. Apparatus for identifying genuineness and denomination of paper money and the like including means for receiving a piece of paper money in said apparatus, means for passing a pinpoint of light at substantially a constant speed over the money in one direction thereon and at frequencies in excess of several hundred cycles a second, means for effecting relative movement between the sweeps of the light and the money in a direction substantially at right angles to the direction of the sweeps to thereby scan progressively a distinct two dimensional area of the money, photocell means for continuously picking up the reflection of the pinpoint of light, means for amplifying the pickup of the photocell means, a plurality of frequency filters each characterized by passing only a predominate frequency, a relay associated with each filter and adapted to be operated when electrical frequencies of the proper predominate range are passed by its associated filter, an interlock between the relays so that the relays can only be operated in a certain predetermined order, and means for retaining the money in the apparatus when the relays are operated in said certain predetermined order, said filters being set to accept in turn and pass the predominate frequencies generated by the progressive scanning of a selected portion of a piece of paper money of a specific denomination.

2. Apparatus for identifying genuineness and denomination of paper money and the like including means on the apparatus for receiving and supporting a piece of paper money outside the apparatus and for moving the money into the apparatus, means for passing a pinpoint of light at substantially a constant speed over the money in one direction thereon and at frequencies in excess of several hundred cycles a second, means for effecting relative movement between the sweeps of the light and the money in a direction at an angle to the direction of the sweeps to thereby scan progressively a distinct two dimensional area of the money, photocell means for continuously picking up the reflection of the pinpoint of light, means for amplifying the pickup of the photocell means, a plurality of frequency filters each characterized by passing only a predominate frequency and connected to the output of the amplifying means, means responsive to the passing of electric current by the filters in predetermined numerical order for retaining the money in the apparatus and for discharging the money from the apparatus when electric current is not passed by the filters in predetermined numerical order.

3. Apparatus for identifying genuineness and denomination of paper money and the like including means on the apparatus for receiving and supporting a piece of paper money outside the apparatus and for moving the money into the apparatus, means for passing a pinpoint of light over the money in one direction thereon, means for effecting relative movement between the sweeps of the light and the money in a direction substantially at right angles to the direction of the sweeps to thereby scan progressively a distinct two dimensional area of the money, photocell means for continuously picking up the reflection of the pin point of light, means for amplifying the pickup of the photocell means, a plurality of frequency filters each characterized by passing only a relative narrow band of frequencies, a relay associated with each filter and adapted to be operated when electrical frequencies of the proper range are passed by its associated filter, an interlock between the relays so that the relays can only be operated in a certain predetermined order, and means for retaining the money in the apparatus when the relays are operated in said certain predetermined order, said filters being set to accept in turn and to pass the predominate frequencies generated by the progressive scanning of a selected portion of a piece of genuine paper money of a specific denomination.

4. Apparatus for identifying genuineness and denomination of paper money and the like including means on the apparatus for receiving and supporting a piece of paper money outside the apparatus and for moving the money into the apparatus, means for passing a pinpoint of light over the money in one direction thereon, means for effecting relative movement between the sweeps of the light and the money in a direction substantially at right angles to the direction of the sweeps to thereby scan progressively a distinct two dimensional area of the money, means for picking up the reflection of the light and for converting it into an electric current, means for amplifying the electric current, a plurality of frequency filters each characterized by passing only a relative narrow band of frequencies, a relay associated with each filter and adapted to be operated when electrical frequencies of the proper range are passed by its associated filter, an interlock between the relays so that the relays can only be operated in a certain predetermined order, and means for retaining the money in the apparatus when the relays are operated in said certain predetermined order, said filters being set to accept in turn and to pass the frequencies generated by the progressive scanning of a selected portion of a piece of genuine paper money of a specific denomination.

5. Apparatus for determining denomination and genuineness of paper money and the like and including means on the apparatus for receiving and supporting the money to be examined outside the apparatus and for moving the money into the apparatus, means for scanning an area of the money with a series of line sweeps, each line spaced adjacent to and parallel to the proceeding line, the scanning means including means picking up the light reflected at any instant from a pinpoint-like area on each line sweep and converting the reflected light into electric current, means for amplifying the electric current generated, a plurality of frequency responsive filters connected to the amplifying means, said filters being adjusted to accept in turn and to pass the predominate frequencies generated by the progressive scanning of the light reflective properties of the selected area of the money if genuine and of proper denomination, interlocked means associated with the filters to determine if the filters accept and pass the predominate frequencies in a certain predetermined order, and means responsive to the actuation of all the interlocked means for accepting the money and retaining it in the apparatus.

6. Apparatus for determining denomination and genuineness of paper money and the like and including means on the apparatus for receiving and supporting the money to be examined outside the apparatus and for moving the money into the apparatus, means for scanning an area of the money with a series of line sweeps, each line spaced adjacent to and parallel to the proceeding line, the scanning means including means picking up the light reflected at any instant from a pinpoint-like area on each line sweep and converting the reflected light into electric current, means for amplifying the electric current generated, a plurality of frequency responsive filters connected to the amplifying means, said filters being adjusted to accept in turn and to pass the frequencies generated by the progressive scanning of the light reflective properties of the selected area of the money if genuine and of proper denomination, interlocked means associated with the filters to determine if the filters accept and pass the predominate frequencies in a predetermined order, means responsive to the interlocked means for accepting the money and retaining it in the apparatus, and means for stopping the operation of the apparatus if the money is not retained therein.

7. Apparatus for determining denomination and genuineness of paper money and the like and including means for receiving and supporting a piece of paper money in the apparatus, said means receiving the money outside the apparatus for movement inside of the apparatus, means for scanning an area of the money with a series of line sweeps each line spaced adjacent to and parallel to the proceeding line, the scanning means including means picking up the light reflected at any instant from a pinpoint-like area on each line sweep and converting the reflected light into electric current, means for amplifying the electric current generated, a plurality of means each adapted to pass in turn only an electric current of a particular predominate frequency generated by the aforesaid scanning means when performed on genuine money of the same country and denomination as the paper money to be tested, and means responsive to the passing of the generated electric current by the last-named means in a certain predetermined order to accept the money under test as genuine and to retain it in the apparatus.

8. Apparatus for determining the denomination and genuineness of paper money and the like and including means for receiving and supporting a piece of paper money in the apparatus, means scanning selected areas of the money and generating a voltage proportional to the lightness of the area scanned and fluctuating in accord with the fluctuation of lightness of the area scanned, a plurality of filter means connected to the generated voltage, each filter means including an L-C circuit tuned to the predominate frequency of the frequency spectrum of the generated voltage for a particular area of the paper money scanned, means for adjusting the L-C circuit to change the predominate frequency to which it is tuned, means for changing the sensitivity of the L-C circuit, a relay associated with each L-C circuit and adapted to be closed when a predominate frequency in tune with the L-C circuit strikes the L-C circuit, means connecting the relays so that no relay can be actuated until its preceding relay is closed, means latching in each relay as closed, means producing a voltage output and responsive to the closing of all relays, and means responsive to said last-named means for unlatching all relays.

References Cited in the file of this patent

UNITED STATES PATENTS

| | | |
|---|---|---|
| 235,900 | Ruckel | Dec. 28, 1880 |
| 800,558 | Dunn | Sept. 26, 1905 |
| 1,083,840 | Kiparski | Jan. 6, 1914 |
| 1,098,379 | Hammond | June 2, 1914 |
| 1,101,453 | Kiparski | June 23, 1914 |
| 2,197,417 | Place | Apr. 16, 1940 |
| 2,224,646 | Friedman et al. | Dec. 10, 1940 |
| 2,231,494 | Dickinson | Feb. 11, 1941 |
| 2,247,684 | Hickok | July 1, 1941 |
| 2,497,656 | Clarke | Feb. 14, 1950 |
| 2,531,236 | Snell et al. | Nov. 21, 1950 |
| 2,570,305 | Barney | Oct. 9, 1951 |
| 2,646,717 | Selgin | July 28, 1953 |
| 2,652,136 | Morrison | Sept. 15, 1953 |
| 2,731,621 | Sontheimer | Jan. 17, 1956 |
| 2,750,519 | Summerhayes et al. | June 12, 1956 |
| 2,774,060 | Thompson | Dec. 11, 1956 |